(12) United States Patent
Cochrane et al.

(10) Patent No.: US 9,864,794 B2
(45) Date of Patent: *Jan. 9, 2018

(54) METHOD AND SYSTEM FOR MANAGING FACETED DATA

(71) Applicant: International Business Machines Corporation, Armonk, NY (US)

(72) Inventors: Roberta J. Cochrane, Mount Kisco, NY (US); Stephanie Hazlewood, Toronto (CA); Patrice Pominville, San Francisco, CA (US); Nancy Taiyab, Thornhill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,073

(22) Filed: Jun. 9, 2014

(65) Prior Publication Data

US 2014/0289256 A1    Sep. 25, 2014

Related U.S. Application Data

(63) Continuation of application No. 12/324,829, filed on Nov. 26, 2008, now Pat. No. 8,751,536.

(51) Int. Cl.
*G06F 17/30* (2006.01)
*G06F 9/44* (2006.01)

(52) U.S. Cl.
CPC ........ *G06F 17/30598* (2013.01); *G06F 9/443* (2013.01); *G06F 9/4433* (2013.01); *G06F 17/30595* (2013.01)

(58) Field of Classification Search
CPC ......... G06F 17/30595; G06F 17/30598; G06F 9/443; G06F 9/4433
See application file for complete search history.

(56) References Cited

U.S. PATENT DOCUMENTS 7,120,646 B2    10/2006 Streepy, Jr.
7,487,189 B2 *   2/2009 Whitlock ............... G06Q 10/10
(Continued)

OTHER PUBLICATIONS

Binding, C. et al., KOS at your service: Programmatic Access to Knowledge Organisation Systems, JoDI—Journal of Information, vol. 4, Issue 4, 2003, 20 pages.
(Continued)

*Primary Examiner* — Huawen A Peng
(74) *Attorney, Agent, or Firm* — Janaki K. Davda; Konrad, Raynes, Davda & Victor LLP

(57) ABSTRACT

A method, system and computer-readable medium for performing hybrid processing of prescribed and dynamically defined attributes for one or more entity instances is provided in one or more implementations of the present invention. The inventive architecture of the present invention including a data structure having a dynamic object abstraction layer configured to: provide for storage and retrieval of facet data independent of one or more prescribed database structures and proprietary object definitions; provide facet attributes in an application object model; provide for defining a number of fixed fields for one or more entities; and, provide for defining and storing one or more dynamic fields for each instance of the one or more entities. The present invention further provides for an application object model being independent of application storage.

19 Claims, 5 Drawing Sheets

(56) References Cited

U.S. PATENT DOCUMENTS

| | | | |
|---|---|---|---|
| 8,751,536 | B2 | 6/2014 | Cochrane et al. |
| 2003/0078902 | A1* | 4/2003 | Leong .................. G06F 9/4435 706/59 |
| 2005/0091342 | A1* | 4/2005 | Frey ..................... G06F 9/4435 709/219 |
| 2006/0242187 | A1* | 10/2006 | Scharf ............... G06F 17/30569 |
| 2007/0011126 | A1 | 1/2007 | Conner et al. |
| 2007/0016608 | A1* | 1/2007 | Mullins ............. G06F 17/30607 |
| 2007/0136221 | A1 | 6/2007 | Sweeney et al. |
| 2007/0288500 | A1 | 12/2007 | Sarnowicz et al. |
| 2009/0077105 | A1* | 3/2009 | DeAnna ................. G06F 9/465 |

OTHER PUBLICATIONS

Beckmann et al., Extending RDBMSs to Support Sparse Datasets Using an Interpreted Attribute Storage Format, in ICDE 2006.

Agrawal et al., Database Technologies for Electronic Commerce, in VLDB 2002.

Agrawal et al., Storage and Querying of E-Commerce Data, in VLDB 2001.

Cochrane et al., Persistance Update, Jan. 2007, Presentation, 47 pages.

Pominville, Definitions of Terms Used to Describe MDM Attributes, Version 1.0, Jan. 27, 2007, IBM Confidential, pp. 14 pages.

Cochrane et al., Technical Feature Requirement Document Persistence, Persistence Architecture for PIM Data, Nov. 24, 2006.

Office Action 1, May 13, 2011, for U.S. Appl. No. 12/324,829, filed Nov. 26, 2008, by R.J. Cochrane et al., Total 24 pp.

Response to Office Action 1, Aug. 12, 2011, for U.S. Appl. No. 12/324,829, filed Nov. 26, 2008, by R.J. Cochrane et al., Total 12 pp.

Final Office Action, dated Nov. 10, 2011, for U.S. Appl. No. 12/324,829, filed Nov. 26, 2008, by R.J. Cochrane et al., Total 21 pp.

Response to Final Office Action, dated Feb. 10, 2012, for U.S. Appl. No. 12/324,829, filed Nov. 26, 2008, by R.J. Cochrane et al., Total 14 pp.

Office Action 3, dated May 23, 2012, for U.S. Appl. No. 12/324,829, filed Nov. 26, 2008, by R.J. Cochrane et al., Total 22 pp.

Response to Office Action 3, dated Jul. 17, 2012, for U.S. Appl. No. 12/324,829, filed Nov. 26, 2008, by R.J. Cochrane et al., Total 12 pp.

Final Office Action 2, dated Oct. 4, 2012, for U.S. Appl. No. 12/324,829, filed Nov. 26, 2008, by R.J. Cochrane et al., Total 23 pp.

Response to Final Office Action 2, dated Nov. 29, 2012, for U.S. Appl. No. 12/324,829, filed Nov. 26, 2008, by R.J. Cochrane et al., Total 11 pp.

Advisory Action, dated Dec. 5, 2012, for U.S. Appl. No. 12/324,829, filed Nov. 26, 2008, by R.J. Cochrane et al., Total 3 pp.

Office Action 5, dated Jun. 12, 2013, for U.S. Appl. No. 12/324,829, filed Nov. 26, 2008, by R.J. Cochrane et al., Total 24 pp.

Response to Office Action 5, dated Sep. 4, 2013, for U.S. Appl. No. 12/324,829, filed Nov. 26, 2008, by R.J. Cochrane et al., Total 11 pp.

Final Office Action 3, dated Sep. 23, 2013, for U.S. Appl. No. 12/324,829, filed Nov. 26, 2008, by R.J. Cochrane et al., Total 23 pp.

Response to Final Office Action 3, dated Dec. 18, 2013, for U.S. Appl. No. 12/324,829, filed Nov. 26, 2008, by R.J. Cochrane et al., Total 12 pp.

Notice of Allowance, dated Jan. 27, 2014, for U.S. Appl. No. 12/324,829, filed Nov. 26, 2008, by R.J. Cochrane et al., Total 13 pp.

Pominville, "A Short History of WPC Product Persistence", Master Data Management, 2006 IBM Corporation, Total 18 pp.

Cobbett, M., "PIMforX Model", Apr. 4, 2007. Retrieved from the Internet at <URL: https://w3.webahead.ibm.com/w3ki/display/emds/PIM%20Terms%20and%20Data%20Model%20Definition>, Total 16 pp.

\* cited by examiner

METHOD AND SYSTEM FOR MANAGING FACETED DATA

CROSS-REFERENCE TO RELATED APPLICATION

Under 35 U.S.C. 120, this application is a Continuation Application and claims priority to U.S. application Ser. No. 12/324,829, filed Nov. 26, 2008, entitled "METHOD AND SYSTEM FOR MANAGING FACETED DATA," which is incorporated herein by reference.

FIELD OF THE INVENTION

The present invention relates generally to a data processing, and more particularly to processing a hybrid of prescribed and dynamically defined attributes for one or more entity instance.

BACKGROUND OF THE INVENTION

Demand for data continues to change dramatically including the demand for data access and management as well as the efficient management of different data types of entities across various domains. International Business Machines (IBM) has introduced a number of products to meet these demands, IBM InfoSphere Master Data Management (MDM) Server for Product Information Management (PIM) and the IBM InfoSphere MDM Server, for customer data integration (CDI), are two such products. Each of these data types, PIM and CDI, also set forth additional challenges in regard to persistence and manipulative aspects.

For example, CDI data types may often be data having canonical representations whose attributes are either flat or represent aggregation "has a" relations to other entities whose existence is not dependent on their parents. By further example, PIM data may have complex attributes being hierarchically-oriented, sparsely populated, multi-value, and represent composition "has a" relations to entities that do not exist outside the context of their parent entities; typically PIM schema (i.e., instance schema) is highly variable, known only at runtime, and is dynamic as it may change over its lifetime.

In practice, it appears that each data type has typically been generally better suited for a particular environment. For instance, for data of a CDI type, a prescriptive type of model is traditionally well-suited, as typically fixed relations are set forth (i.e., named columns, named fields, etc.) which over time remain suited for the implementation of CDI types of data. In this manner, data extensions may be handled in a variety of ways such as providing for adding new tables or columns, or the addition of attributes using a vertical representation supporting chunks of 10 extension attributes per database, for example. By further example, for data of a PIM type, a flexible model that does not provide named columns or fields but supports attributes which may be defined throughout the lifetime of the data and which enables product categories to evolve and change as needed, is traditionally better suited.

However, the persistence and manipulation of these types of data, more so of the PIM type, as well as other data types, is becoming more complex, particularly at the service layer (i.e., highly structured programming languages such as java) and in systems where the data models are unable to handle the complexity (i.e., where volume of information per instance such as amount and variety of information per instance). Further, the marketplace is seeking integration of PIM-data type functionality with CDI-data type techniques in the near future.

Managing entities that have typically prescriptive bounds is of interest in today's marketplace. In this manner, the management of common attributes (i.e., attributes that are common to all instances of a given entity type or the attributes that are completely determined by the entity's type) is sought. Common attributes are typically made up of platform attributes and, optionally, deployment attributes to supplement the out-of-the-box platform attributes in system offerings. Common attributes may also be further segmented and categorized in certain situations.

FIG. 1A sets forth an exemplary depiction of an entity type 198 that supports only common attributes 197 representing a basic system level entity 199. Depicted in FIG. 1A are platform attributes 196 and deployment attributes 195, each with its respective type definition (i.e., Spec), 194 and 193. As used herein, the term "Spec" is intended to mean definition of platform and extension attributes while are predefined or known in advance, for example. An example of this is the contact or party entity in which may be provided in a predefined manner with a fixed set of attributes (i.e. platform attributes), to which extension or deployment attributes may be added thereto to enhance the entity.

However, managing entities that typically have less prescriptive bounds to the set of data they capture, i.e., facet attributes (attributes that apply to a subset of the instances of a given entity type), in the relational database and the supporting application code presents technical challenges.

For instance, at the service layer, where service calls (i.e., service requests) may be made without knowledge of the type of data to be encountered, conventional approaches prove insufficient. By example, in conventional approaches, data may be encountered having attributes that were known and often not known at the time of the data model build, resulting in faceted attributes. Faceted attributes, as used herein, are understood to be properties or characteristics of the attributes of the objects being represented in which, depending on the context, the properties or characteristics may be relevant or not. Faceted attributes are further understood as being attributes whose applicability varies between any two instances of a given entity type, where any given instance could have its own unique set of facet attributes, although, however, any given set of facet attributes often applies to more than one entity. Conventionally then, service requests of data where the representation of data is dynamically changing in an environment that is structured is problematic for systems today as the structure first needs to be created for the service call. Similarly, conventional approaches also typically require the service layer to have knowledge of the facet attributes, whether relevant or not, since all facet information must typically be read and written whenever any of the attributes are accessed in these approaches. The persistence and manipulation of such data in such systems is also a challenge.

Unfortunately conventional approaches typically require cumbersome extensions which result in the addition of many database structures and additional application code (object representation) to execute business logic against the new data. These approaches also presents a decrease in performance particularly when the data is sparsely populated, as the in-memory object representation can become extremely large and all possible attribute definitions and values, despite their use in a particular entity instance always exist and have a minimum value (null) stored. Additionally, these approaches are limited as they require that the objects are coupled to the underlying database structures that have been defined to store the attributes, and are not easily extensible, as the facet attributes of the application change. Another traditional attempt to overcome these issues includes providing extensions in the data model to account for new structure resulting in extension "blow outs," particularly in heavily-structured environments as such data models will extract all data attributes when only a select few fields may be needed for the query.

These conventional approaches attempt to account for the structure by using proprietary object representation that attempt to handle all attributes in a dynamic fashion, where typically nothing is prescribed per entity type. The resolution of all attributes is done in a dynamic fashion, where even common attributes must first be resolved per entity instance of a particular entity. Additionally, the extensions resulting in these approaches require in-depth knowledge of a non-standard proprietary object representation to support the introduction of new attributes. Further all facet information stored in these approaches must be read and written whenever any of the attributes are accessed, and specialized data structures are required to read and manipulate the data structure.

Each of these approaches is problematic and does not overcome the issues set forth and fails to address the needs of demands for systems capable of overarching data management, regardless of type. Additionally, these traditional approaches can result in decreased performance of the systems as unnecessary processing effort is spent on querying, extension assignments and data extraction. Further each of the approaches is further limited as each requires that the application access to the objects be tightly coupled with the representation, resulting in the fact that the choice of the storage for facet information cannot be changed easily.

As a result of these limitations and the implementation of traditional (i.e., conventional) approaches, database structure housing the prescribed and dynamically defined attributes with an application is typically coupled. Therefore, it becomes difficult if not impossible to replace a database structure without affecting processing of the prescribed and dynamically defined attributes.

Since most applications now prefer to use open systems and new capabilities are also desired by users, such as XML, accordingly, there exists a need for a solution providing facet attributes in an application object model with independent application storage providing for the substitution of various storage representations that best suit a given access pattern with minimal impact to the application model. Additionally, there exists a need for a solution for decoupling an application and persistence representations for facet attributes in a data management system. The present invention addresses such needs.

SUMMARY OF THE INVENTION

A method, system and computer-readable program for performing hybrid processing of prescribed and dynamically defined attributes for one or more entity instances is provided in one or more implementations of the present invention.

A system for performing hybrid processing of prescribed and dynamically defined attributes for one or more entity instances is provided. In one implementation, the system includes: a processor; memory; a database; a data structure having a dynamic object abstraction layer providing for storage and retrieval of facet data having static and dynamic attributes; and a module stored in the memory and executable on the processor to provide a software platform; the module for defining services that interact with static and dynamic representations of the data, the interaction for static data including having a business objects module for interacting with the persistence mechanism; and the interaction for dynamic data defining one or more abstraction layers in relation to the business objects module and the persistence mechanism.

A method of implementing a software architecture for processing a hybrid of prescribed and dynamically defined attributes for one or more entity instances, the architecture is provided for. In one implementation, the architecture comprises: providing for a data structure having a dynamic object abstraction layer; providing for storage and retrieval of facet data having static and dynamic attributes by a module; the module for defining services that interact with static and dynamic representations of the data, the interaction for static data including having a business objects module interacting with the persistence mechanism; and the interaction for dynamic data, having an Application Persistence Abstraction Layer, a Storage Persistence Abstraction Layer and a Persistence Mechanism and for providing for an application object model independent of application storage for facet data.

A computer-readable medium embodying computer-executable code that implements a software architecture for processing a hybrid of prescribed and dynamically defined attributes for one or more entity instances, is also provided for. A data structure having a dynamic object abstraction layer providing for storage and retrieval of facet data having static and dynamic attributes is then provided. The architecture comprises: a module for defining services that interact with static and dynamic representations of the data, the interaction for static data including having a business objects module for interacting with the persistence mechanism; and the interaction for dynamic data defining one or more abstraction layers in relation to the business objects module and the persistence mechanism.

DETAILED DESCRIPTION OF PREFERRED EMBODIMENTS

Figure 1A:
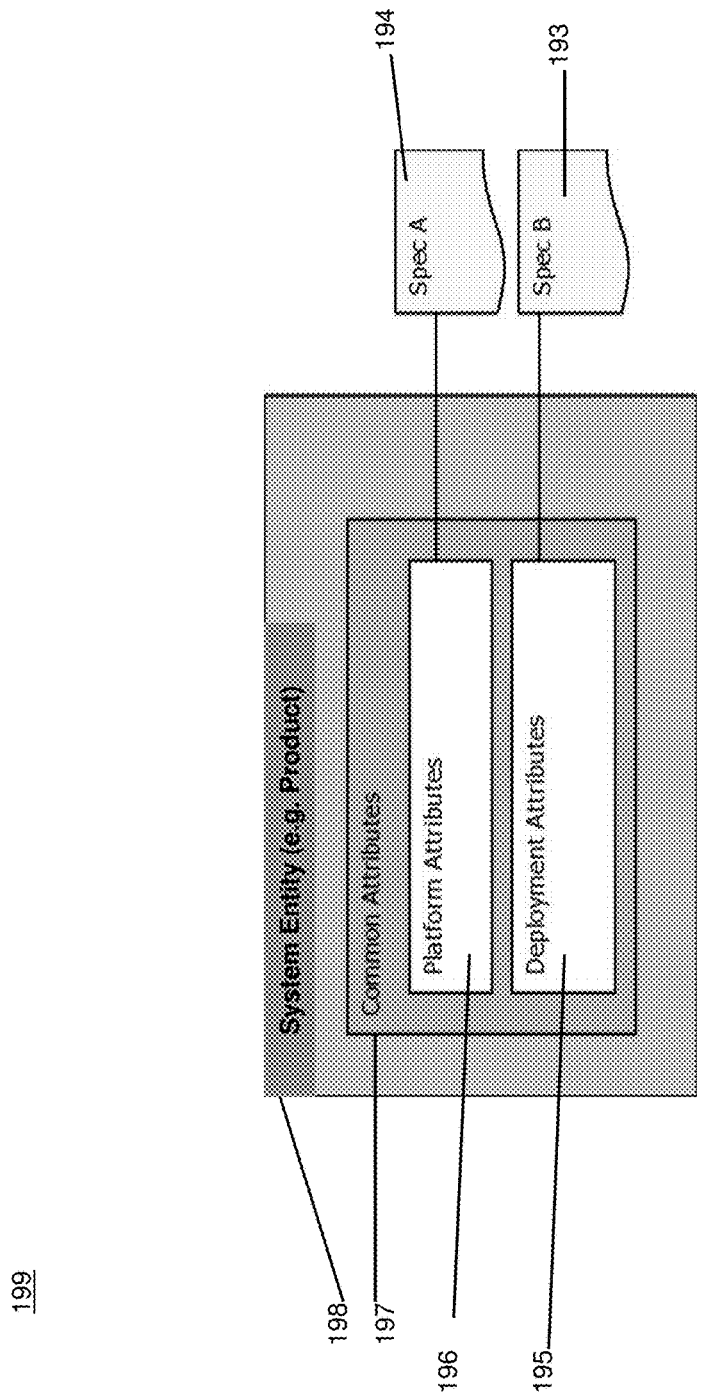
FIG. 1A sets forth an exemplary depiction of a built-in type Product that supports only common attributes representing a basic system level entity.

The present invention relates generally to a data processing, and more particularly to processing a hybrid of prescribed and dynamically defined attributes for one or more entity instance. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

For the present invention, for each entity type, a different set of attributes may apply. In this regard, the product entity type may have different attributes than the customer entity type. Typically these attributes may be defined by, and optionally shipped with a system platform of the present invention (i.e., platform attributes), as well as additional attributes that are industry/implementation specific and defined at deployment time (i.e., deployment attributes).

The present invention also provides for facet attributes which are set forth herein as those attributes whose applicability varies between any two instances of a given entity type, where any given instance could have its own unique set of facet attributes, although, however, any given set of facet attributes often applies to more than one entity. For example, a physical book product may have attributes such as number of pages, author and edition that do not apply to electronic book products which, instead, have attributes like power consumption, regulatory compliance and voltage. These two sets of attributes are understood to be distinct "facets" that would each apply to a given subset of the products of a given entity type. However, a given product might have many facets associated with it: for example an electronic music player may have electronic attributes as well computer product attributes. Conversely, some instances may not have any facet attributes at all.

It will be appreciated by those skilled in the art that for the present invention, therefore, facet attributes as provided for in various implementations of the present invention may include attributes (i.e., facets) comprising deployment and/ or platform attributes for instance, where some facets could be made up partly or even fully of one or other attribute type, such as platform attributes (e.g. such as those which may support an "industry-standard" for certain categories/domains, or possibly auxiliary standard facets) in relation to the system platform. The present invention, in its various implementations, contrary to conventional approaches, does not require that only relevant attributes or only known attributes be used. For instance, a service layer is not required to have knowledge of all of the facets, but by the present invention, the service layer is enabled to focus on only those facets having relevance to the service call (i.e., relevant facets).

Further, for the present invention, common attributes for an entity type may be partitioned in to two types including: Base Attributes, being those attributes that are common to all entity types derived from, by example, Product; and Subtype Attributes, being those attributes, by example, specific to a given Product subtype.

Figure 1B:
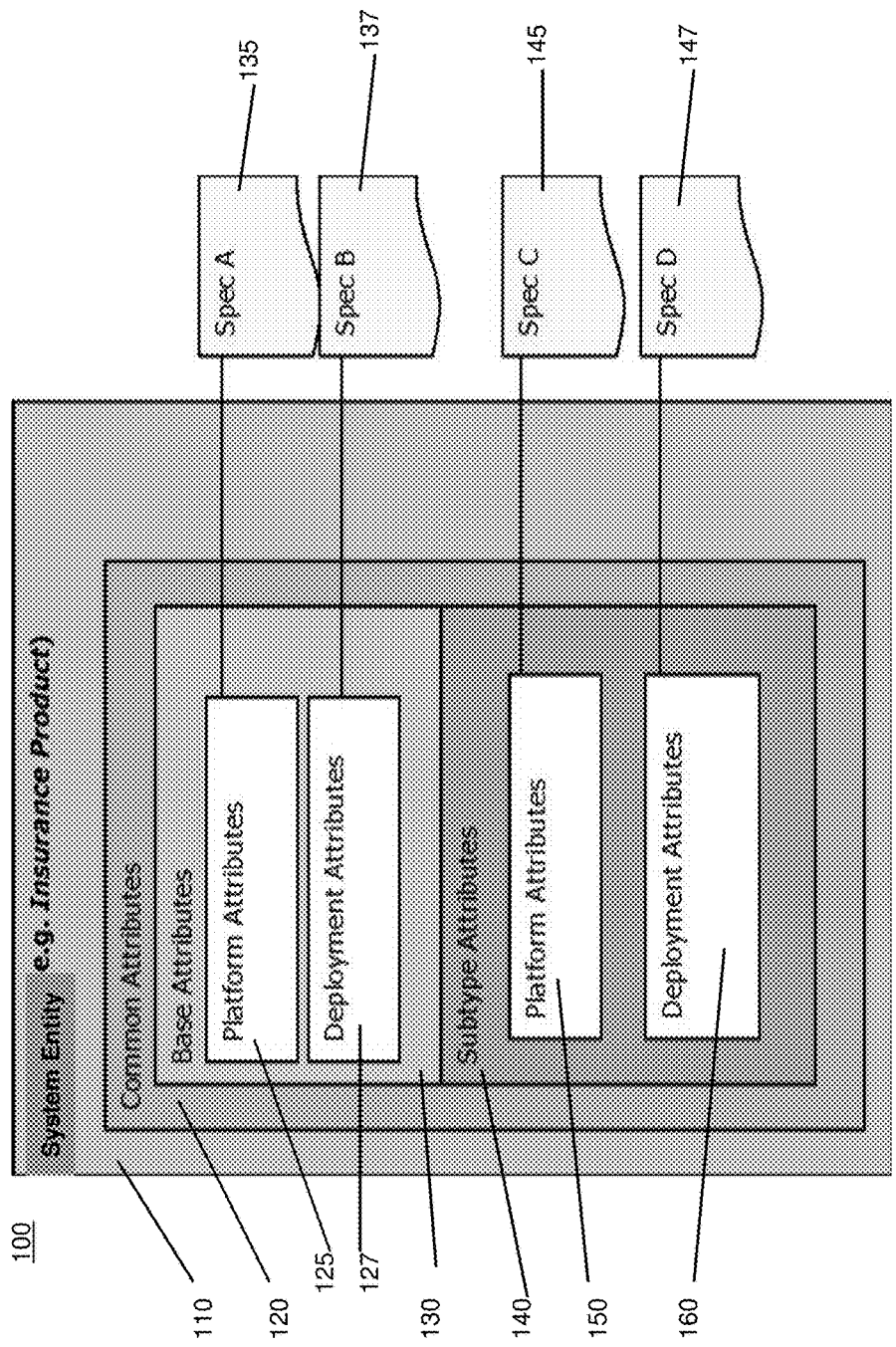
FIG. 1B sets forth an exemplary depiction of a built-in subtype (i.e., a small, extensible set of entity types provided by the platform), in which a subtype of the built-in type Product, Insurance Product, in accordance with an implementation of the present invention, is provided.

FIG. 1B sets forth an exemplary depiction of a built-in type (100) (i.e., a small, extensible set of entity types provided by the platform), in accordance with an implementation of the present invention, in which a subtype of the entity, Insurance Product (110), is provided. A subtype is preferably a type that is created by extending an existing built-in type (e.g., given the built-in type Product, it is possible to develop subtypes of Product such as Insurance Product). From FIG. 1B, the System Entity Product ("Product") 100 is an existing built-in type and contains only base attributes 130. Insurance Product is a subtype of Product and contains the base attributes 130 it inherits from Product 100 as well as subtype attributes 140 specific to Insurance Product 110. Additionally, from FIG. 1B, both subtype and base attributes have platform and deployment attributes at 125, 127, 150 and 160. Associated with its respective attributes, are Specs at 135, 137, 145 and 147.

Figure 2:
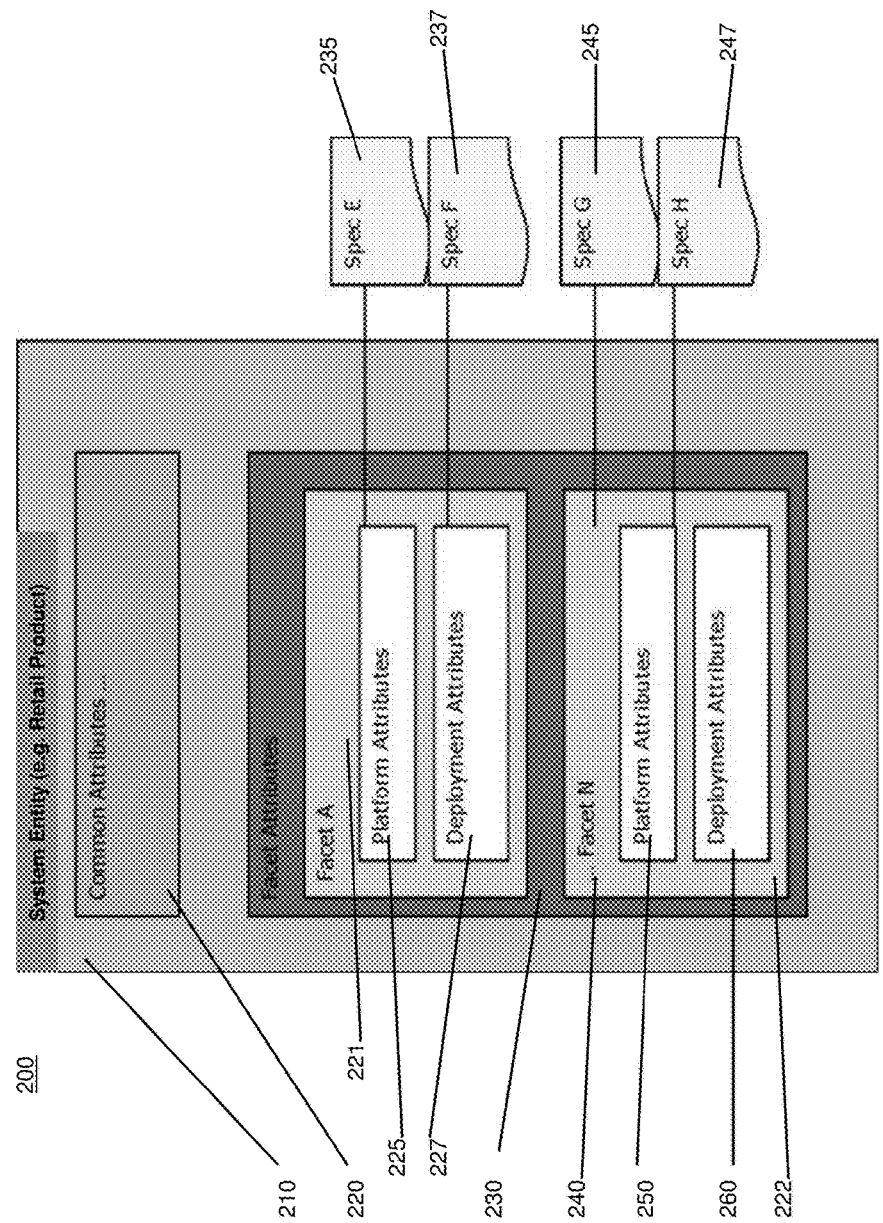
FIG. 2 sets forth an exemplary depiction of a built-in subtype, in which a subtype of the built-in type Product, Retail Product, in accordance with an implementation of the present invention, is provided.

FIG. 2 sets forth an exemplary depiction of a built-in type (200), in accordance with an implementation of the present invention, in which a subtype of the entity, Retail Product (210), is provided. From FIG. 2, Retail Product is a subtype of Product and contains the common attributes 220 it inherits from Product 198 as well as facet attributes 230 specific to Retail Product 210, including Facet A 221 through Facet N 222. Additionally, from FIG. 2, Facet types have platform and deployment attributes at 225, 227, 250 and 260. The unit of definition for attributes is called a Spec. For example, we could define a "marketing spec" that defines attributes that are related to marketing, a "technical spec" that defines technical attributes and a "banking product spec" that defines attributes common to all banking products. A given entity instance might have one or more specs that apply to it. The sum total of all its attributes is said to be its schema. Associated with its respective fact attributes, are Specs at 235, 237, 245 and 247.

As used herein, the term attribute has a unit of definition of a Spec, which defines attributes that are related to a particular unit. For example a "marketing spec" may be a Spec that defines attributes that are related to marketing whereas a "technical spec" may be a Spec that defines technical attributes, and a "banking product spec" may be a Spec that defines attributes common to all banking products. It will be appreciated by those skilled in the art that for the present invention, a given entity instance might have one or more specs that apply to it. Further, as is used herein, the sum total of all of the attributes is the schema.

Further, attribute types of the present invention in various implementations may also include associated name/value pairs or more complex attributes on an instance-by-instance basis at runtime in addition to those previously set forth as being defined in specs, either at deployment time or in the platform itself. These additional associated or complex attributes are termed herein as Dynamic Attributes, and preferably, would not require an existence in any spec of the system and as such may be created dynamically. Dynamic attributes can be dynamically added to instances at runtime, but are not defined in a spec, are created on the fly, and tagged on to an instance.

Figure 3:
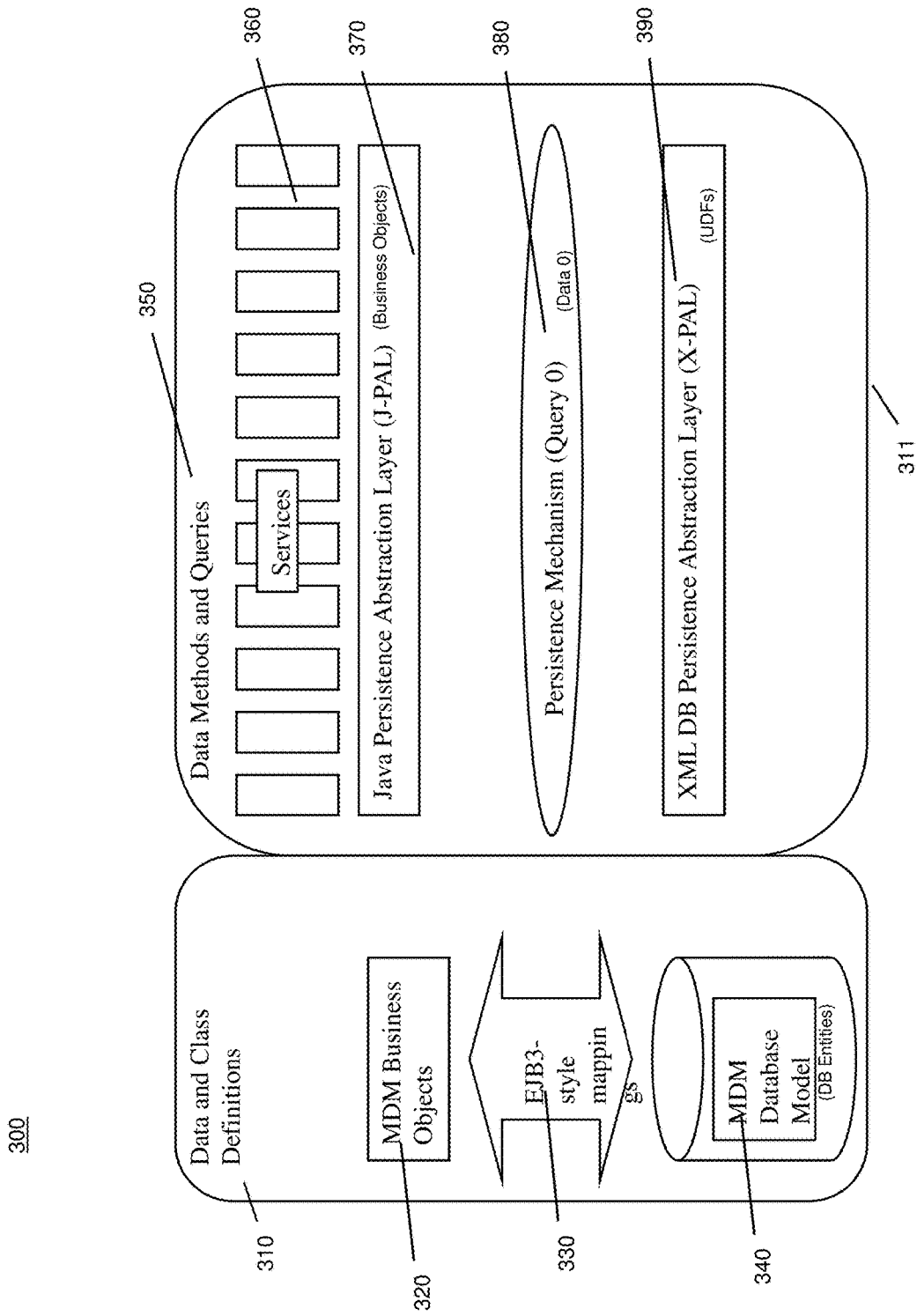
FIG. 3 sets forth an architecture of the present invention in accordance with various implementations.

FIG. 3 sets forth an architecture of the present invention in accordance with various implementations. From FIG. 3, a software architecture of a system is set forth at 300. From FIG. 3, a services layer for providing services is at 360; an application persistence abstraction layer (PAL) for insulating the services from the representation of the attributes in the business objects, is at 370; business objects are set forth at 320; a storage persistence abstraction layer for insulating the rest of the application from the particular storage mechanism used in the database is provided at 390; a persistence mechanism (i.e., pureQuery) providing for linkages with database storage, is at 380; and a Master Data Management (MDM) Database Model (i.e., database model) is at 340.

From FIG. 3, it will be appreciated by those skilled in the art that the persistence artifacts of the system having the architecture of the present invention (300) consist of the business objects 320, the database model 340, and the mapping in between at 330, in which both static and dynamic attributes are supported (i.e., hybrid) and in which the database model and business objects are relationally mapped via an mapping mechanism at 330. In a preferred implementation, the mapping mechanism may be an EJB3 style mapping mechanism. It will be further appreciated by those skilled in the art that in the present invention attributes which were once dynamic may become static, and attributes which were once static may become dynamic.

Database Model (340)

The database model for a system of the present invention is defined from an analysis model describing the objects. The database model of the present invention provides for: reuse and/or enhancement of existing database tables from existing prescriptive model types, where possible; and, optimum performance on data retrieval of hierarchical and variable data structures. For example, in the database model, the primary System entities derived from the analysis model which are realized in the database model could include: hierarchy, category, item, and location. Other entities that have been identified to support these main entities may include: bundle, itemset, organization (company). Furthermore, it is envisioned that the database model may be accessed by several application models, not all of which need to be the same.

Application Persistence Abstraction Layer (PAL) (370)

The PAL provides for insulating the services from the representation of the attributes in the business objects. Preferentially, the PAL is a Java PAL (i.e., J-PAL) and is used interchangeably herein to reflect such, although functionally, the present invention is not so limited. In this manner, the PAL provides support for the flexibility to represent common attributes as either named fields or interpreted fields. It also provides to dynamically add facet attributes as a particular item and use-case may require. Another flexibility provided is the ability to retrieve an interpreted column from the database and expand the retrieved column into named fields within the business object. The interface of the present invention in various implementations preferably supports the methods in existing application entities in which such methods are written so as not to expose the underlying representation of the attributes in the business objects.

Figure 4:
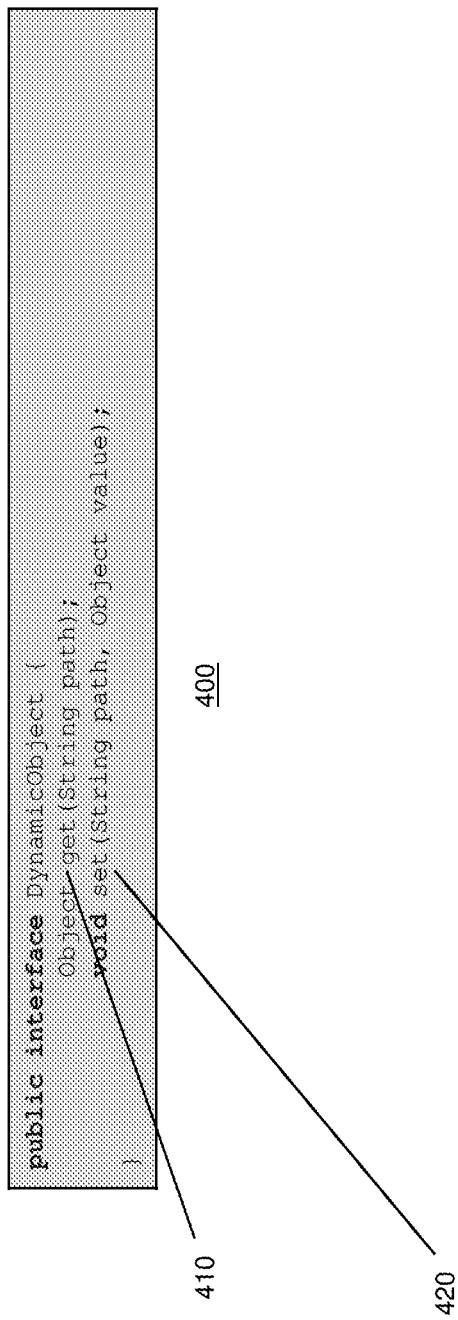
FIG. 4 sets forth a DynamicAttribute interface (i.e., a public interface application programming interface [API]) of the present invention in accordance with an implementation.

In a preferred implementation, the PAL supports the DynamicAttribute interface shown in FIG. 4, and provides for implementing methods of a common, or base class object. The PAL of the present invention provides for getting the XML representation of attributes without having to instantiate a full object tree that is then serialized. Further, preferably, the PAL provides a mechanism to let the client specify what attributes he intends to view or modify to facilitate data access optimizations. In a preferred implementation, the PAL accepts XPATH as a way of setting attribute values, though the present invention and PAL are not so limited.

FIG. 4 sets forth a DynamicAttribute interface (i.e., public interface application programming interface [API]) 400, of the present invention in accordance with an implementation. The interface 400 for each entity preferably, at a minimum, supports a "get by path" 410 and a "set by path" 420. Since both common and facet PIM attributes are hierarchical and multi-valued, the path language used by the get/set methods of the dynamic interface 400 to System attributes provides for support in the addressing of individual instances of the attributes. In a preferred implementation, the System (or as also used herein MDM), adopts the subset of XPATH used by Service Data Objects (SDO) as its path language.

In one implementation, by example, the present invention provides for:

String value=obj.get("some_spec/some_attribute[2]"); or
String value=obj.get("some_spec/some_attribute.1");

It will be appreciated by those skilled in the art that the present invention provides for the API managing these instances such that the creating and deleting of instances of multi-valued attributes may be performed. In a further implementation, by example, the present invention provides for using an SDO-styled API as:

DynamicAttribute obj=obj.get(some spec");
DynamicAttribute instance=obj.createDataObject("some-_attribute");
List instances=obj.get("some_spec/some_attribute");
instances.add(instance);
instance.delete( );

In the above implementation example, the PAL preferably provides a mechanism to selectively retrieve a subset of the XML representation of the attributes. In one implementation, it is envisioned that a set of paths could be considered to be a "view" of the attributes.

Persistence Mechanism (380)

A Persistence Mechanism of the present invention links Java and database storage. The Persistence Mechanism provides for: storing data from java objects into database tables as records; retrieving records from database tables as Java objects; updating records in database tables with Java objects; removing records in database tables with Java; and searching records in database tables with Java. Preferably, the Persistence Mechanism provides for one or more of: performing simple object/relational (O/R) mapping, including a no entity relationship or inheritance needs representation; mapping of Java Bean attribute name to table column name; super class mapping; and SQL generation for CRUD operation.

Storage Persistence Abstraction Layer (390)

The present invention further provides for a storage persistence abstraction layer to insulate the rest of the application from the particular storage mechanism used in the database. The storage persistence abstraction layer (storage PAL) of the present invention provides a set of API's for this layer that support the queries needed by the upper layer. The API's of the storage PAL will generally include XML queries or user defined functions to access the data in the database, though the present invention is not so limited. The API's of the storage PAL support update and retrieval of XML data via an XPATH expression. This provides for the upper layers to work with XML data at the attribute level.

Preferably, the storage PAL layer provides for one or more of: identifying the query types needed to support the data model and services; specification of the API's to support the queries; identifying the storage mechanism and XML parsing technology to be used for each Database version and operating system supported; generating XML queries and User Defined Functions to support the retrieval and update of XML data. and investigating the persistence mechanism and how it can be used to support the XML queries and Java UDF's defined for this layer.

As used herein the term "persistence" is intended to generally mean taking temporary data (e.g., in-memory program data) and storing it in a more permanent form where in a persistence framework, the framework moves transient program data in its most natural form to and from a permanent data store.

It will be appreciated by those skilled in the art that the present invention in various implementations may also provide for APIs for a dynamic object abstraction layer and persistence abstraction layer that allow for the standard storage and retrieval of facet data, without relying on prescribed database structures, or a proprietary object definition, in which the present invention incorporates SDO technology which may be either static with a fixed number of fields or dynamic allowing an unlimited number of fields. The dynamic object API of the present invention allows for definition of a number of fixed fields for an entity and also provides for allowing for the definition and storage of dynamic fields not only per entity, but each instance of a particular entity.

The present invention may be embodied in software which may also be resident on computer readable medium such as a magnetic or optical disk, for instance. The computer-readable recording medium can be any kind of recording device that stores computer system-readable data, such as ROM, RAM, CD-ROM, magnetic tape, floppy discs, optical data storage devices, etc., or carrier waves (e.g., a transmission over the Internet). Also the computer-readable recording medium may be distributed among computer systems connected via a network, so that the code corresponding to the present invention can be stored and executed in a decentralized manner.

The present invention may be embodied in a computer-readable storage medium having embodied thereon a computer program for executing various implementations and methods of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for processing of facet data, wherein the system comprises a processor, a memory device coupled to the processor, and a module coupled to the memory device which, when executed by the processor, causes the processor to provide a software platform, wherein the software platform includes:
a services layer for providing services that interact with the facet data;
an application persistence abstraction layer for insulating the services from a business objects module and from static and dynamic attributes of the facet data by supporting a DynamicAttribute interface that provides specification of particular static and dynamic attributes of the facet data to be accessed, provides an extensible markup language (XML) representation of the particular static and dynamic attributes of the facet data without instantiating a full object tree that is serialized, and enables setting values for the particular static and dynamic attributes, wherein the DynamicAttribute interface comprises a public interface application programming interface (API);
a storage persistence abstraction layer for insulating the business objects module from a storage mechanism used in a data structure; and
a persistence mechanism for linking the business objects module to the data structure.

2. The system of claim 1, wherein storing and retrieving of the facet data is independent of at least one prescribed database structure and a proprietary object definition.

3. The system of claim 1, wherein the application persistence abstraction layer is a Java persistence abstraction layer.

4. The system of claim 1, wherein the system further provides an application object model that is independent of application storage for the facet data and provides for storage representation substitution.

5. The system of claim 1, wherein the data structure comprises:
the business objects module; and
a database model coupled to the business objects module via a mapping mechanism.

6. The system of claim 5, wherein the mapping mechanism relationally maps the business objects module to the database model.

7. The system of claim 5, wherein the mapping mechanism is an Enhanced Java Beans 3 (EJB3) style mapping mechanism.

8. The system of claim 1, wherein the static and dynamic attributes of the facet data are determined from a Spec.

9. The system of claim 1, wherein the application persistence abstraction layer provides for at least one of:
implementing at least one base class object;
expanding at least one interpreted column retrieved from a database into at least one named field within the business objects module; and
facilitating data access optimizations by specifying the particular static and dynamic attributes of the facet data.

10. The system of claim 1, wherein the persistence mechanism provides for at least one of:
storing data from Java objects into tables of the data structure as records;
retrieving records from the tables as Java objects;
updating records in the tables with Java objects;
removing records in the tables with Java;
searching records in the tables with Java;
performing simple object/relational (O/R) mapping, including any of a no entity relationship and inheritance needs representation;
mapping of Java Bean attribute names to column names of the tables;
super class mapping; and
SQL generation for create, read, update, delete (CRUD) operations.

11. The system of claim 1, wherein the storage persistence abstraction layer provides at least one of:
insulating an application from at least one storage mechanism used in the data structure;
providing a set of APIs to support queries needed by an upper layer;
identifying query types to support a database model and the services;
identifying a storage mechanism and parsing technology used for each supported storage medium and operating system; and
generating user-defined functions to support retrieving of the facet data.

12. A method for processing facet data, the method comprising:
providing a services layer for providing services that interact with the facet data;
providing an application persistence abstraction layer for insulating the services from a business objects module and from static and dynamic attributes of the facet data by supporting a DynamicAttribute interface that provides specification of particular static and dynamic attributes of the facet data to be accessed, provides an extensible markup language (XML) representation of the particular static and dynamic attributes of the facet data without instantiating a full object tree that is serialized, and enables setting values for the particular static and dynamic attributes, wherein the DynamicAttribute interface comprises a public interface application programming interface (API);

providing a storage persistence abstraction layer for insulating the business objects module from a storage mechanism used in a data structure; and providing a persistence mechanism for linking the business objects module to the data structure.

13. The method of claim 12, wherein the data structure comprises:
   the business objects module; and
   a database model coupled to the business objects module via a mapping mechanism.

14. The method of claim 12, wherein the application persistence abstraction layer provides for at least one of:
   implementing at least one base class object;
   expanding at least one interpreted column retrieved from database into at least one named field within the business objects module; and
   facilitating data access optimizations by specifying the particular static and dynamic attributes of the facet data.

15. The method of claim 12, wherein the persistence mechanism provides for at least one of:
   storing data from Java objects into tables of the data structure as records;
   retrieving records from the tables as Java objects;
   updating records in the tables with Java objects;
   removing records in the tables with Java;
   searching records in the tables with Java;
   performing simple object/relational (O/R) mapping, including any of a no entity relationship and inheritance needs representation;
   mapping of Java Bean attribute names to column names of the tables;
   super class mapping; and
   SQL generation for create, read, update, delete (CRUD) operations.

16. The method of claim 12, wherein the storage persistence abstraction layer provides at least one of:
   insulating an application from at least one storage mechanism used in the data structure;
   providing a set of APIs to support queries needed by an upper layer;
   identifying query types to support a database model and the services;
   identifying a storage mechanism and parsing technology used for each supported storage medium and operating system; and
   generating user-defined functions to support retrieving of the facet data.

17. A non-transitory computer-readable medium embodying computer-executable code that implements a software platform for processing of facet data, wherein the software platform includes:
   a services layer for providing services that interact with the facet data;
   an application persistence abstraction layer for insulating the services from a business objects module and from static and dynamic attributes of the facet data by supporting a DynamicAttribute interface that provides specification of particular static and dynamic attributes of the facet data to be accessed, provides an extensible markup language (XML) representation of the particular static and dynamic attributes of the facet data without instantiating a full object tree that is serialized, and enables setting values for the particular static and dynamic attributes, wherein the DynamicAttribute interface comprises a public interface application programming interface (API);
   a storage persistence abstraction layer for insulating the business objects module from a storage mechanism used in a data structure; and
   a persistence mechanism for linking the business objects module to the data structure.

18. The non-transitory computer-readable medium of claim 17, wherein the application persistence abstraction layer provides for at least one of:
   implementing at least one base class object;
   expanding at least one interpreted column retrieved from a database into at least one named field within the business objects module; and
   facilitating data access optimizations by specifying the particular static and dynamic attributes of the facet data.

19. The non-transitory computer-readable medium of claim 17, wherein the data structure comprises:
   the business objects module; and
   a database model coupled to the business objects module via a mapping mechanism.

* * * * *